March 26, 1963  R. F. CELMER  3,083,104
METHODS FOR RECOVERING LIQUIDS FROM VEGETATIVE MATERIALS
Filed April 13, 1959  5 Sheets-Sheet 1

FIG. 1

INVENTOR.
RALPH F. CELMER
BY
Stone, Boyden & Mack,
ATTYS.

FIG. 3

INVENTOR.
RALPH F. CELMER

FIG. 4

United States Patent Office 3,083,104
Patented Mar. 26, 1963

3,083,104
METHODS FOR RECOVERING LIQUIDS FROM VEGETATIVE MATERIALS
Ralph F. Celmer, 28 W. Morris St., Bath, N.Y.
Filed Apr. 13, 1959, Ser. No. 805,915
33 Claims. (Cl. 99—103)

This invention relates to the production of liquid extractions from vegetative materials and particularly to an improved process for obtaining, more rapidly and economically, improved yields of low solids content liquids from fruits and vegetables.

Investigators have long attempted to devise a method whereby highly fluid vegetable or fruit pulps could be pressure extracted without clogging of the extractor and without an undue proportion of solids passing through with the liquid being recovered. Particular attention has been given in the past to the possibility of continuous pressure extraction of fruit and vegetable juices with a device such as a continuous screw press or a centrifugal extractor. But, because of the marked tendency of vegetable pulps to clog such devices and for pulp solids to pass readily with the juice, little success has been achieved with continuous methods except in the case of unusual pulps, such as fermented grapes, or when only a relatively small proportion of the available liquid is to be recovered.

Because of high labor and material costs, there is a critical need for improvement in pressure extractions, both with the common hydraulic rack and cloth press and with continuous devices. The need for a successful continuous process is particularly apparent, for example, in the Concord grape industry.

Because of the extremely slippery, gelatinous nature of the pulp obtained from Concord grapes, it is especially difficult to continuously extract these grapes without clogging of the extractor, and all prior attempts to employ continuous presses on Concord grapes have completely failed.

The present invention provides a method for pressure extracting vegetative materials whereby the yields obtained with reciprocating presses are markedly improved and whereby continuous pressure extraction is, in the case of numerous vegetative materials, made commercially feasible for the first time. Stated broadly, the invention is characterized by the provision of a highly fluid pulp, in which the liquid retaining particles are predominantly disrupted, and by the incorporation in such a pulp of relatively small amounts of certain absorbent alpha cellulose fibers. As will be explained in detail, the fibers must be of a definite type having certain physical characteristics and serve to form an intertangled mass which retains the vegetative solids but allows pressure extraction of the liquid.

When the invention is employed to extract fruit or vegetative juices, the vegetative pulp may first be conditioned, as by action of a pectic enzyme in a preferred embodiment, and the cellulose fibers then added to the conditioned pulp. Alternatively, the fibers may be added to the pulp along with the enzyme or even prior to addition of the enzyme. Thus, when processing grapes, it is sometimes preferable to add both the enzyme and the fibers to the pulp received in the crusher sump. Similarly, when processing apples, for example, it is desirable to add the fibers to the bulk apples before disintegration, as in a hammer mill, so that the fibers tend to absorb the juice more readily and are more uniformly distributed in the pulp.

In many applications, conditioning of the pulp in accordance with the invention requires best treatment accompanied by gentle maceration. Thus, the pulp may be agitated by means of a paddle mixer, or circulated through a heat exchanger in such manner that movement of the pulp causes gentle maceration, or circulated by means of a pump having an impeller member designed to macerate the pulp solids. When fluidizing of the pulp is accomplished by means of a pectic enzyme, the action of the enzyme in breaking down the pulp solids is promoted both by heat and maceration.

While extraction may be accomplished by any suitable pressure extractor, the invention is most advantageous when a continuous screw press or a continuous centrifugal extractor is employed. A single continuous extractor providing two serially disposed extraction zones, the first at a relatively lower pressure for obtaining free run juice and the second at a relatively higher pressure for obtaining press juice, may be used. Similarly, two series connected continuous presses may be employed, the first extracting free run juice at a relatively low pressure, and the second extracting press juice at higher pressure. Another suitable procedure is to treat the conditioned pulp first with a high speed centrifugal extractor to obtain free run juice, and then to treat the residual pulp, or pomace, with a continuous screw extractor to obtain the remaining, or press, juice. Typical suitable extractors of the continuous screw type are disclosed in United States Patents 2,664,814, issued January 5, 1954, to C. E. Alborn, and 2,609,744, issued September 9, 1952, to C. A. Rietz, while a typical suitable centrifugal extractor is Sharples model PY–14, described in Bulletin No. 1254, issued 1950, by the Sharples Corporation, Philadelphia, Pennsylvania.

In accordance with the invention, the desired pulp may be produced directly from the bulk fruit or vegetable, or may be obtained by specially treating an initial pulp. Thus, in the case of vegetative materials such as apples, pears, carrots, celery, and the like, a highly fluid pulp in which most of the juice retaining fragments are disrupted may be obtained by disintegrating the bulk material by means of a hammer mill or other suitable comminuting apparatus. In the case of materials such as grapes, the material is first crushed to provide an initial pulp of relatively high viscosity and containing a major proportion of unruptured pulp aggregates, and this initial pulp is then specially treated to decrease its viscosity and rupture a predominant proportion of the juice retaining pulp particles.

In a preferred embodiment of the invention, this conditioning, that is, reducing the viscosity of the initial pulp is accomplished by means of a pectic substance-degrading enzyme preparation. Such preparations are readily available on the commercial market in the form, for example, of an enzyme system including polygalacturonase and pectinesterase (pectase). Such pectic enzyme materails are usually prepared from the growth of mold fungi on nutrient media such as wheat or rice bran, wheat middlings, and soya bean meal with or without the addition of pectin. Suitable organisms include *Aspergillus niger, Aspergillus flavus, Aspergillus oryzae, Aspergillus fumigatus, Aspergillus parasitans, Aspergillus tamari, Aspergillus wentii, Rhizopus nigrocans, Pennicillum glaucum*, and the like. Extracts are prepared from the culture and are employed directly as enzyme compositions. Alternatively, the extract may be treated with a water-miscible, volatile, organic solvent such as a lower aliphatic alcohol and the polygalacturonase-pectinesterase system then precipitated.

In accordance with the invention, a small amount of the pectic substance-degrading enzyme preparation is incorporated in the initial pulp which is then heated at about 100–125° F. for about 10–60 minutes with concurrent agitation of such nature as will provide a gentle maceration. As the heating and maceration continues, the pulp becomes markedly more fluid and the freeing of the pulp fragments is readily apparent.

In the case of grapes, for example, such enzyme treatment is effective to reduce the relative viscosity of the pulp to as low as one third of its initial value and free floating seeds, skins and pulp fragments are apparent in the more fluid conditioned pulp.

Standardization of the activity or potency of such enzymatic materials is extremely difficult. Manufacturers providing such preparations usually employ standardization procedures which are not publicly disclosed and, as a result, competitive products are comparable only with difficulty. As a standard in the present invention, I ascribe unit activity to a pectic substance-degrading enzymatic material which, when incorporated in amounts in the range of 0.2–0.4% by weight in Concord grape pulp which is then maintained at 110° F. for 10–30 minutes with gentle maceration, will reduce the relative viscosity of such pulp to one half to one third its initial value. A pectic enzyme preparation having such unit activity is "Pectinol M," a pectic enzyme system referred to as the intermediate product in United States Patent 2,599,531, issued June 10, 1952, to Smythe et al. Such product includes polygalacturonase, pectinesterase, and undetermined amounts of other polysaccharidases. It appears that such enzymatic preparations rupture the juice retaining particles of the pulp, such effect being apparently due in part to the action of polygalacturonase in splitting the pectic chain and the action of pectinesterase in hydrolyzing the methyl ester groups of the pectin molecule.

In the treatment of frutis such as grapes, berries, peaches, cherries, and the like, I have discovered that such conditioning of the pulp by the enzymatic preparation is enhanced by an additional heating step in which the temperature of the pulp is raised, within about 5–30 minutes, to a value of about 140–200° F.

While a preferred embodiment of the invention employs enzymatic treatment in conditioning the pulp, and while it is to be understood that such treatment is often superior in the case of grapes and other fruits, I may employ other procedures for conditioning the pulp, as will now be described.

Initial grape pulp, for example, may be heated at 175–195° F. for about 30–120 minutes with agitation, as in a paddle mixer or in circulation through heat exchange tubes by a pump. Similarly, the pulp may be cooked at higher temperatures under superatmospheric pressure for a shorter period of time. Such severe heating may be employed, for example, in preparing fruit juice for jelly making.

Where the characteristic fresh fruit taste is desired in the product, conditioning may be carried out at room temperature by extensive maceration. Thus, the pulp may be macerated for a longer time period, or may be macerated more vigorously. In the case of cold conditioning of grapes, for example, the initial pulp received from the stemmer and crusher may be passed through a specially adjusted Fitz mill or the like to extensively disrupt in a relatively short time all portions of the pulp save the seeds. Materials such as apples may be thoroughly disintegrated in the cold by means of a hammer mill or like comminuting apparatus.

As another alternative conditioning procedure, the vegetative material may be frozen and then either thawed or disintegrated without prior thawing. In either case, the freezing and thawing action is effective to disrupt a predominant proportion of the juice retaining particles. In the first instance, a preliminary grape pulp, for example, is frozen and then thawed to provide a highly fluid conditioned pulp. In the second, berries, for example, may be frozen in bulk and the frozen material then disintegrated, as by means of a hammer mill or the like, to provide a slushy pulp.

All such conditioning procedures produce a conditioned pulp which is not suitable for treatment in a continuous pressure extractor. If such conditioned pulp were passed directly to a continuous screw press, for example, the press would soon clog and the juice obtained would be unduly high in solids. However, by such conditioning procedures, I obtain a conditioned pulp of such nature that alpha cellulose fibers may be uniformly distributed therein to assume a random orientation, the juice of the pulp being largely available for absorption by the fibers. Then, if suitable fibers are employed, the application of pressure will express low solids content juice and the residue will be in the nature of a mass of intertangled fibers in which the pulp solids are entrapped. It will be understood that such conditioning procedures as have been referred to disrupt the juice retaining particles of the vegetable materials in such manner that not only is the juice more readily available but also the pulp solids are so dispersed as to be more effectively trapped by the added alpha cellulose fibers.

I have discovered that successful continuous pressure extraction high yields of low yields content juice can be carried out if the added fibers are soft, absorbent, alpha cellulose fibers substantially free from fines and predominantly in the range of 1–10 mm. in length. When dispersed in the pulp, such fibers soak up a material proportion of the juice and form an intertangled mass of swollen fibers with small pulp particles adhered to or adsorbed on the surfaces of the fibers and with larger pulp fragments distributed through such mass so as to be trapped or enmeshed thereby as the mass is compressed.

While other fibers may have the aforementioned characteristics and therefore be suitable, the only satisfactory fibers which I have found to date are the chemically purified alpha cellulose fibers produced either from the softwoods or from cotton. Very finely divided purified wood cellulose, commercially available in average fiber lengths on the order of 0.3 mm., has been found to be unsuitable for the present process. Similarly, fibers prepared from the hardwoods, predominantly less than 1 mm. in length, proved to be not suitable. Further, relatively coarse natural fibrous materials, such as disintegrated wood, straw, sugar cane bagasse, and the like, are entirely unsuitable in the process of this invention. Such materials, employed in their natural state, contain hemicelluloses, lignin, and other materials which impart impurities to the juice. The physical characteristics of such disintegrated natural fibrous materials are apparently considerably different from purified alpha cellulose fibers obtained from the softwoods and cotton. Thus, I have found that materials such as disintegrated straw or bagasse not only fail to form the desired intertangled mass of soft, absorptive fibers, but they break down in the vegetative pulp so as to increase the difficulties normally encountered in attempting to extract untreated fruit or vegetable pulp in a continuous pressure extractor. Relatively long purified fibrous materials, such as the conventional "absorbent cotton" of commerce, have been found to be unsuitable in the present process.

A particularly advantageous fibrous material for use in accordance with the invention is prepared from commercially refined bleached sulfite softwood pulp by screening the purified softwood pulp to remove the fines. Commercially available sulfite softwood pulps contain an excessive proportion of fines, usually on the order of 15% by weight, but can be chemically and physically refined to reduce the fines to a negligible amount. The refined fiber can be provided in the form of soft sheets and the sheets may be broken into fragments which, when added to the vegetative pulp being treated, readily disintegrate to allow dispersion of the fibers. An alpha cellulose fibrous material produced from purified bleached sulfite softwood pulp in this manner is characterized by a fiber length predominantly in the range of 1–3 mm. Thus, a typical product, produced by fluffing and screening refined alpha pulp made from commercial bleached sulfite softwood pulp, had an average fiber length of 1.6 mm. with 71.6% of the fibers within the range of 1–3 mm. in length and only 4% passing a 100 mesh screen. Alpha cellulose content of this material was 90–92%. I have made and used loose and fluffy alpha fibers with less than 1% of such fibers passing through a 100 mesh screen.

Another particularly advantageous fibrous material is the commercially available filtermass manufactured from long fiber cotton. The purified alpha cellulose fibers of such filtermass are predominantly longer than 1 mm. and less than 10 mm. The alpha cellulose content is approximately 95%. Fluffed material low in fines can also be made from cotton cellulose.

It is to be understood that the predominant fiber length of the alpha cellulose fibers is of extreme importance to success of the continuous pressure extraction. If the fibers be too short, as when they are predominantly shorter than 1 mm., they will not only tend to pass through into the juice but will also fail to form the intertangled fiber mass necessary to trap the pulp solids. If the fibers be too long, they will tend to ball up in the continuous extractor, again preventing formation of the required intertangled fiber mass.

I have found that fibers having the characteristics referred to are effective in the present invention when incorporated in the vegetable pulp in proportions in the range of 0.5–5% by weight of the pulp.

Figure 1:
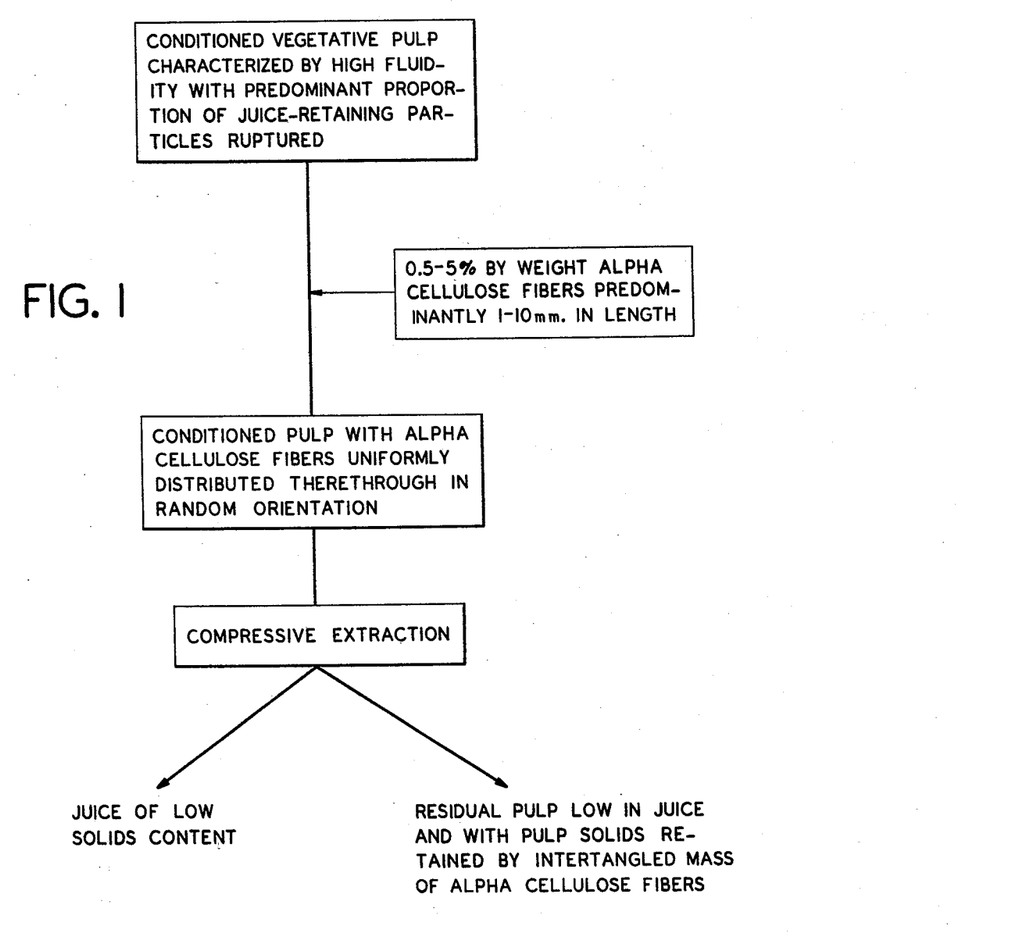

FIGS. 1–5 illustrate flow sheets for various embodiments of the present invention. As seen in FIG. 1, to a vegetative pulp specially conditioned by any of the aforementioned conditioning procedures is added 0.5–5% by weight of the alpha cellulose fibers hereinbefore specified to provide a pulp in which the fibers are uniformly distributed in random orientation. The pulp is then fed through a continuous screw pulp press or, alternatively, through a continuous centrifugal extractor or a conventional reciprocating press. The pulp may be flowed to such apparatus either by pumping or by gravity. The continuous pressure extractor provides, on the one hand, a low solids content juice and, on the other hand, a relatively dense residual pulp consisting of grape solids retained by an intertangled mass of the alpha cellulose fibers. While a vertical continuous screw pulp press is diagrammatically indicated, it will be understood that a horizontal screw press may be employed.

Figure 2:
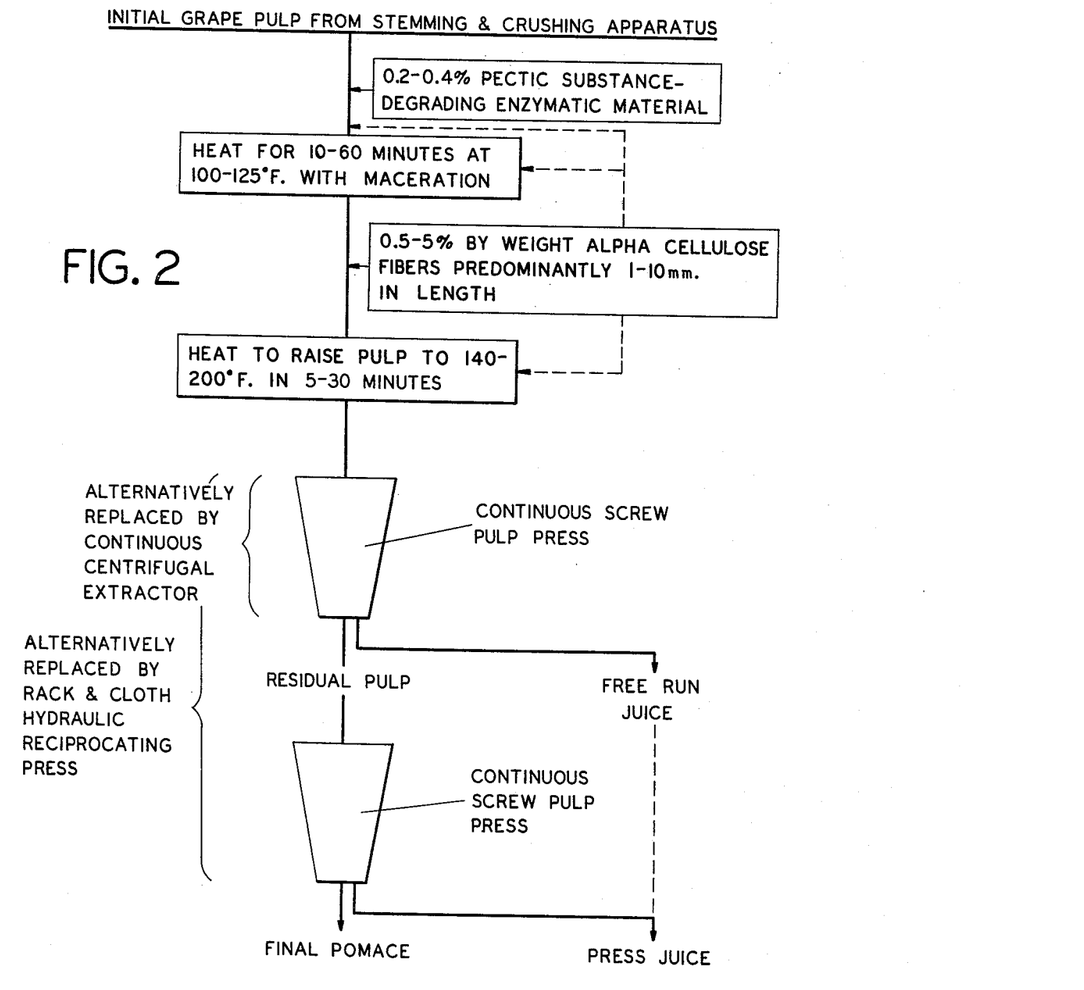

Referring now to FIG. 2, a grape pulp as received from a conventional stemmer and crusher is combined with .2–.4% by weight of a pectic substance-degrading enzymatic material such as the aforementioned "Pectinol M." The pulp is then heated for 10–60 minutes at 100–125° F., as in a glass-lined heating and mixing tank, or a conveying heat exchanger, or other suitable means wherein both heating and maceration can be accomplished concurrently. 0.5–5% by weight alpha cellulose fibers having the hereinbefore specified characteristics is added at the end of such operation, or before heating is started, or while heating and maceration is carried on, or in the following step. The pulp is then raised to 140–200° F. in about 5–30 minutes. The pulp so conditioned is then flowed through a continuous screw press operated at higher speed, lower pressure to recover free run juice. The residual pulp is passed continuously through a second continuous screw pulp press operated at lower speed, higher pressure to recover press juice. Alternatively, the first continuous screw press may be replaced by a continuous centrifugal extractor.

Figure 3:
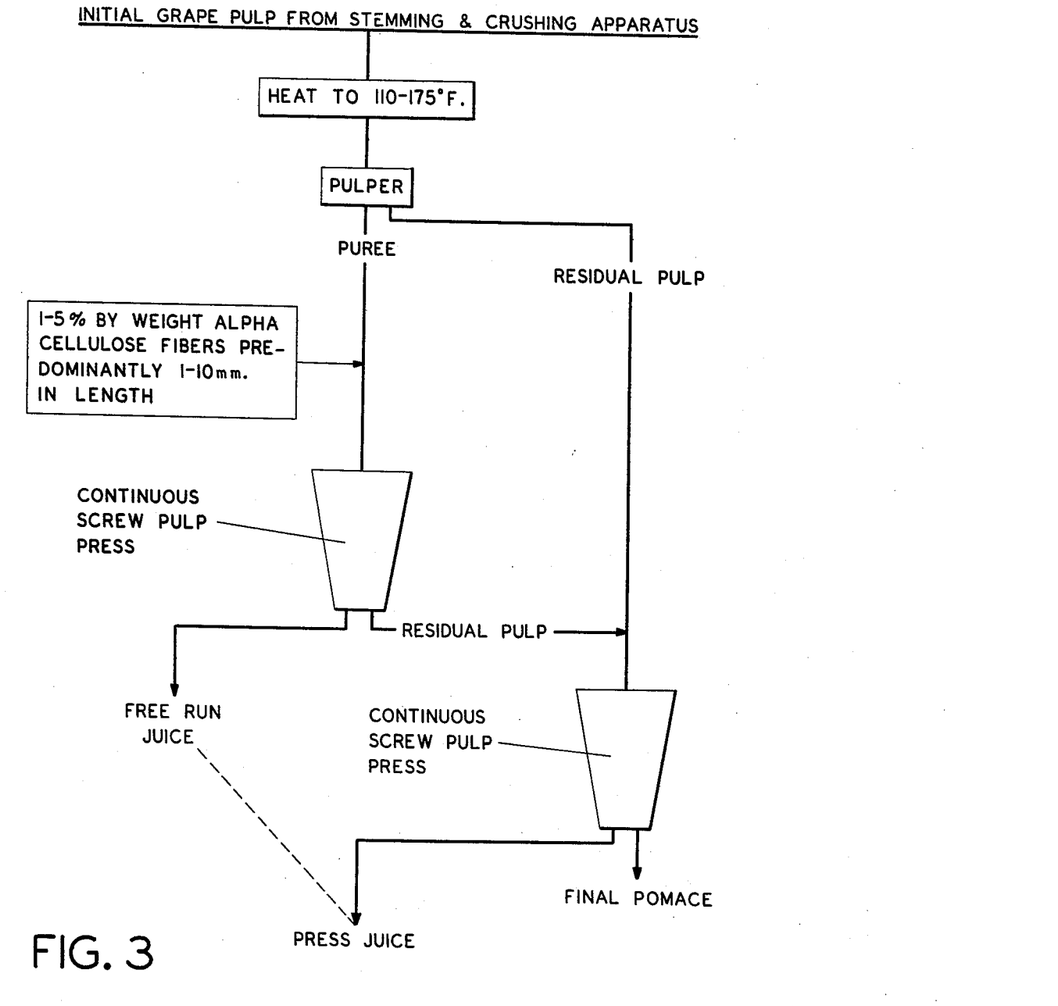

As indicated in FIG. 3, initial grape pulp as received from a conventional stemming and crushing apparatus may be heated to 110°–175° F. and treated with a pulper to separate a puree, ordinarily about 75% of the pulp, from a residual pulp. To the puree is added 1–5% by weight of the aforementioned alpha cellulose fibers, the puree then being flowed through a continuous screw press to separate free run juice from a residual pulp containing a relatively high proportion by weight of alpha cellulose fibers. Such residual pulp is then combined with the residual pulp from the pulper and the combined residual pulp passed through a continuous screw pulp press to recover the press juice.

Figure 4:
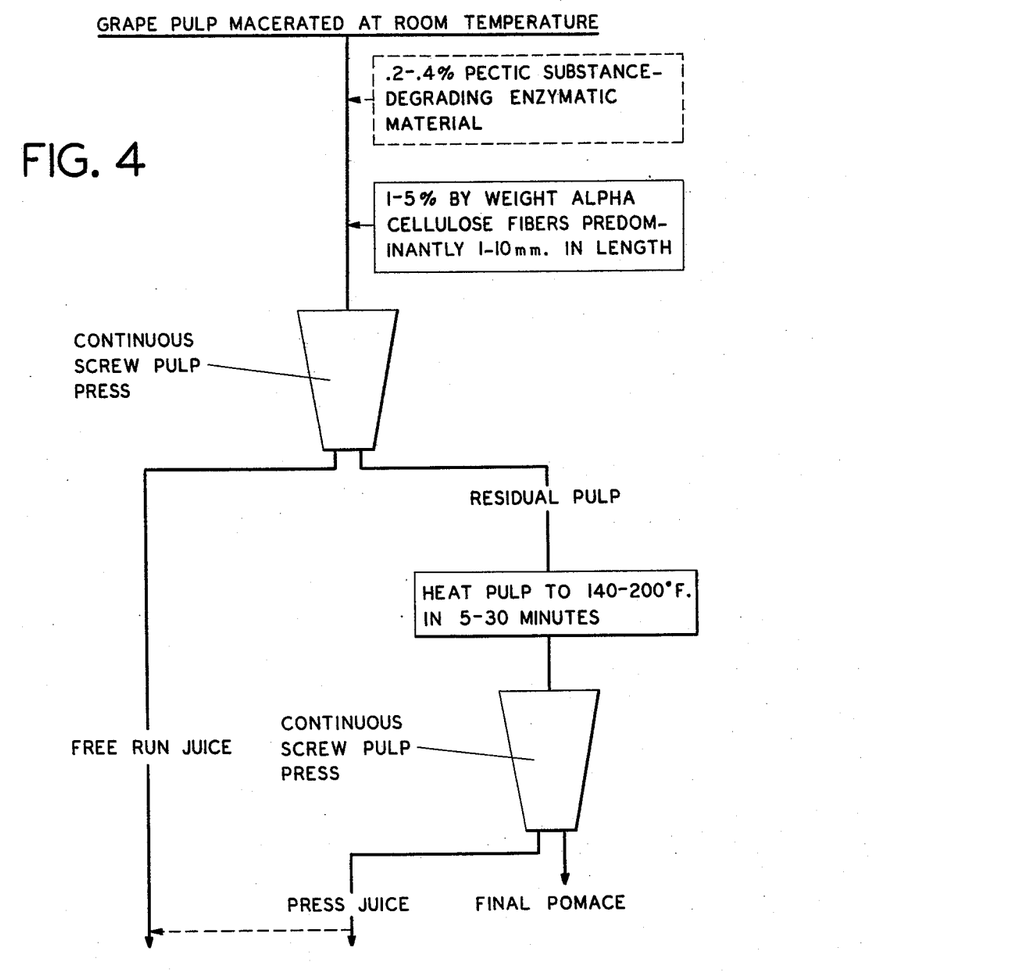

As seen in FIG. 4, grape pulp which has been macerated at room temperature is combined with 1–5% by weight of the aforementioned alpha cellulose fibers and passed at room temperature through a continuous screw pulp press to separate free run juice from residual pulp. The latter is then heated to 140–200° F. within 5–30 minutes and the heated pulp passed through a second continuous screw press for hot pressing of the press juice. The hot press juice may then be combined in desired proportion with the free run juice, the latter having a characteristic fresh fruit flavor. Alternatively, .2–.4% of a pectic substance-degrading enzymatic material may be added prior to the first pressing step to better condition the pulp and increase the yield of free run juice.

Figure 5:
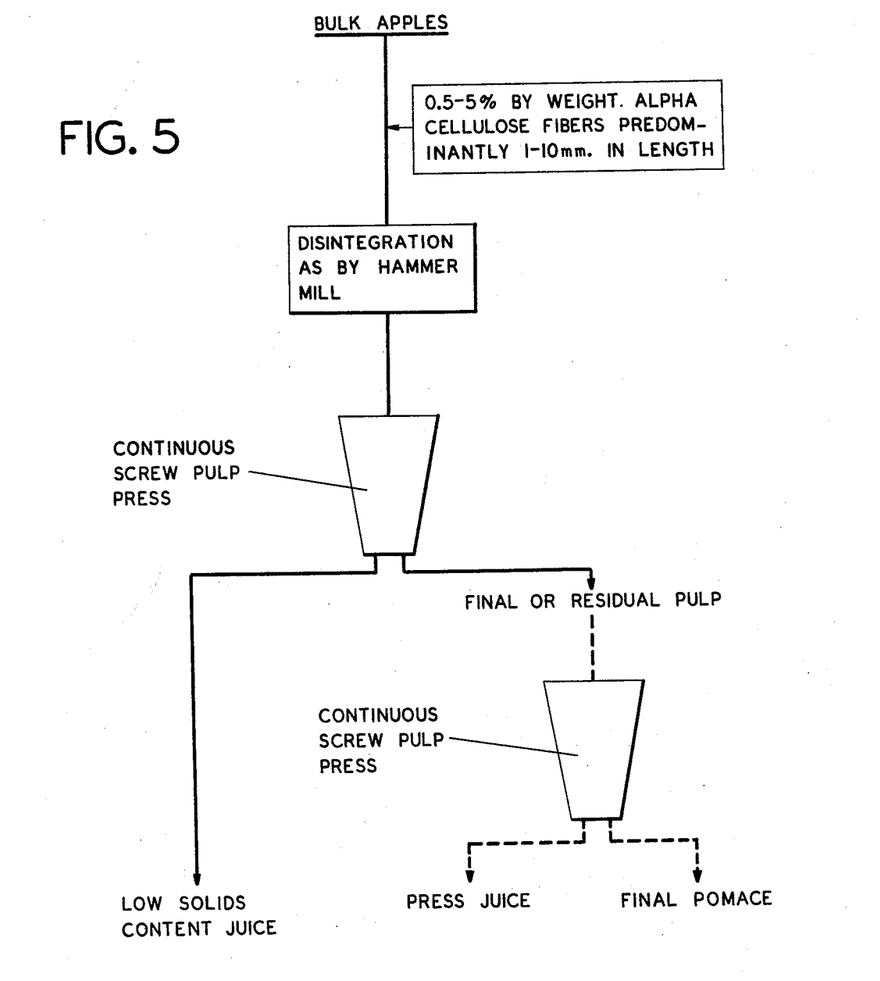

As seen in FIG. 5, the alpha cellulose fibers may be added to the bulk material before disintegration when the invention is employed to obtain juice from vegetative materials of the class consisting of apples, pears, quinces, peeled pineapples, peel-free pineapple fragments, carrots, beets, rhubarb and celery. The bulk material including the fibers is then disintegrated in a hammer mill or the like and the resulting pulp passed through a continuous screw extractor to recover low solids content juice. In some cases, depending upon the nature of the material being treated, the pulp from this operation may be passed through a second continuous screw pulp press to recover press juice.

The following examples are illustrative:

*Example 1*

One hundred gallons (890 pounds) of stemmed and crushed Concord grapes were received at 70° F. in a glass-lined mixing tank. Three pounds (0.34% by weight) of "Pectinol M" (a pectic enzyme preparations, comprising polygalacturonase and pectinesterase, and being in the nature of the intermediate product referred to in United States Patent 2,599,531, issued June 10, 1952, to Smythe et al.) was added to the pulp and the pulp agitated for 10 minutes to insure even distribution of the enzyme. The pulp was then circulated through a vacuum steam preheater at 110° F. for 30 minutes. The mixing tank, pump and preheater were connected in a series closed circuit so that the pulp was continuously macerated by action of the mixer and pump. A marked increase in fluidity of the pulp mass was noted, and it was observed that seeds, skins and pulp fragments floated freely in the pulp. The relative viscosity of the pulp was reduced by this treatment to less than one half its initial value.

Five pounds (0.5%) of soft, fluffed, purified, bleached, sulfite wood pulp which had been substantially freed of fines was then added to the pulp and thoroughly dispersed by the mixer. This material had an average fiber length of 1.6 mm. with 71.6% of the fibers being within the range of 1–3 mm. in length and only 4% passing a 100 mesh screen. Alpha cellulose content of the fibrous material was 90–92%.

The conditioned pulp, with the fibrous material dispersed therein, was then circulated through the heat exchanger for 15 minutes with the heat exchanger temperature at 140° F. Terminal temperature of the pulp was 138° F.

With the mixer continually agitating the pulp at 138° F., the pulp was then pumped through a conventional horizontal, centrifugal extractor (Model PY-14 "Super-D-Canter" described in Bulletin No. 1254, issued in 1950, the Sharples Corporation, Philadelphia, Pa.) at the rate of 15 gallons per minute. The extracted free run juice broke its foam quickly, had a good deep color, and centrifuging tests showed a solids content of only 0.3% by volume. The residual pulp or pomace discharged from the extractor as loose, moist pellets of skins, seeds and cell debris enmeshed in the tangled cellulose fibers and having a moisture content of 54% as H₂O. The extracted free run juice was 721 pounds (81 gallons) or 80.3% by weight of the original pulp.

The 177 pounds of residual pulp was passed through a continuous screw vertical pulp press of the type disclosed in the aforementioned Patent 2,664,814 with the counter pressure set at 85 pounds and the residual pulp still at 130–135° F. The extracted press juice so obtained weighed 85 pounds or 11.4% by weight of the original pulp. This press juice showed a solids content of 3% by volume. The final pomace delivered by the continuous press amounted to 8.3% by weight of the original pulp and was a crumbly, semi-dry mass from which the seeds were easily separated. Such pomace can be dried at a lower temperature and faster rate than can the pomace from conventional hydraulic press extractions, so facilitating by-product recovery. Total juice recovery was 91.7% by weight of the original pulp.

Example 2

The procedure of Example 1 was followed, except that 0.56% of "Solka-Floc BW20," a disintegrated purified wood cellulose having an average fiber length of 0.3 mm., was employed in place of the bleached sulfite pulp of Example 1. A yield of 70% free run juice was obtained from the centrifugal extractor, but this juice had a suspended solids content of 7% by volume and included an excessive amount of skin flakes. The residual pulp from the centrifugal extractor was a sludge having a moisture content of 64.3% unsuitable for satisfactory extraction to recover the residual, or press, juice of low solids content.

Example 3

Two hundred sixty-five gallons (2360 pounds) of stemmed and crushed Concord grapes was received in a glass-lined mixer at 65° F. and heated to 100° F. Five pounds (0.25% by weight) of "Pectinol M" was then added and the pulp mixed for 30 minutes at a continuing temperature of 100° F. A definite increase in fluidity of the pulp was noted at this stage. With agitation continuing, the temperature of the pulp was then raised progressively over a period of 30 minutes to a final value of 160° F. A very highly fluid pulp resulted.

Twenty three pounds, ten ounces (1.0% by weight) of the cellulose fiber employed in Example 1 was then added and the pulp was then mixed for 10 minutes to disperse the fibers uniformly, the temperature being maintained at 160° F.

The pulp was then pumped to the hopper of the continuous vertical screw-press and thence delivered to the press at a press intake rate of approximately 2.5 tons per hour. Starting counter pressure on the press was 120 pounds until a cake formed, the counter pressure then being adjusted to 65 pounds. Free run juice was obtained at the rate of 43 pounds per minute. Total free run juice was 1794 pounds (200 gallons) or 76% by weight of the original pulp. Suspended solids content of the free juice was 3.2% by volume.

The residual pulp was placed in the hopper of a vertical continuous screw press. The press was operated with a counter pressure of 100 pounds and at an intake rate of approximately 2 tons per hour. The residual, or press, juice obtained was 378 pounds (42.5 gallons) or 16% by weight of the original pulp. Suspended solids content of the press juice was 3.9% by volume.

Note: Conventional use of this press, without employing the process of this invention, produces a free run juice with a suspended solids content in excess of 10% by volume and a residual pulp which is not suitable for continuous extraction of low solids press juice. The screens in this particular press have .04" openings. For the invention, screens having openings .02–.03" in diameter can be employed.

Example 4

The free run and press juices obtained in Example 3 were combined with other Concord grape juice higher in solids content to provide a combined juice with a suspended solids content of 5% by volume. To a batch of 320 gallons (2848 pounds) of the combined juice, heated at 170° F., was added 12.5 pounds (0.39% by weight) of the cellulose fiber employed in Example 1, the juice then being agitated for 15 minutes to thoroughly disperse the fibers.

The juice was then passed through the centrifugal extractor employed in Example 1 at the rate of 150 pounds per minute. The clarified juice totaled 2822.5 pounds, a 98.7% recovery, and showed a suspended solids content of 0.6%. Thus, 88% of the solids was removed.

Example 5

To thirty pounds of stemmed and crushed Concord grapes at 80° F. was added 0.4% by weight of "Pectinol M." The pulp was then mixed by hand with a blunt paddle intermittently for 40 minutes. At the end of this period, 1% by weight of the cellulose fiber employed in Example 1 was added. The pulp was then mixed for an additional 20 minutes. The temperature was maintained at approximately 80° F. throughout the entire mixing period. At the end of this time, the pulp was observed to be materially more fluid than the original pulp.

The pulp was then extracted with a horizontal continuous screw press equipped with a .02" screen to obtain free run juice totalling 17.5 pounds (58.3% by weight of the original pulp) and having a suspended solids content of 0.7% by volume. The residual pulp, amounting to 41.7% of the original pulp, was in suitable condition for satisfactory continuous extraction of the press juice.

Example 6

To thirty pounds of stemmed and crushed Concord grapes at 80° F. was added 0.4% by weight of "Pectinol M." The pulp was then heated at 105° F. for 20 minutes with continual maceration by means of a blunt hand paddle. At the end of this period, 1% by weight of the cellulose fiber employed in Example 1 was added, and heating then continued, accompanied by maceration, for an additional 10 minutes. The resulting pulp was considerably more fluid than that obtained in Example 5.

The pulp was then extracted with a horizontal continuous screw press equipped with a .02" screen to obtain free run juice totalling 21 pounds (70% by weight of the original pulp) and having a suspended solids content of 0.4% by volume. The residual pulp, amounting to 30% by weight of the original pulp, was in suitable condition for satisfactory continuous extraction of the press juice.

Example 7

Two 10-pound lots of stemmed and crushed Concord grapes were separately cooked at 15 pounds steam pressure (226.9° F.) for 5 minutes and combined to provide an extremely fluid pulp. To this pulp was then added 1% by weight of the cellulose fibers employed in Example 1, the pulp then being mixed for 20 minutes without additional heating. The temperature of the pulp at the end of the mixing operation was 190° F.

The pulp was then extracted with a horizontal continuous screw press equipped with a .02" screen to obtain free run juice totalling 16.4 pounds (82% by weight of the original pulp) and having a suspended solids content of 0.5% by volume. The residual pulp, amounting to 18% of the original pulp, was in suitable condition for continuous extraction of press juice.

Example 8

A Concord grape pulp received from conventional crushing and stemming apparatus is heated to 110° F. and 0.4% by weight "Pectinol M" added thereto. The pulp is then maintained at 110° F. for 30 minutes while continually agitating the pulp to macerate the same.

The resulting highly fluid pulp is sieved by means of a pulping machine to separate a thin puree, constituting approximately 75% by weight of the original pulp, from a residue consisting of a wet mixture of seeds and adhering pulp and skin fragments.

To the thin puree is then added 1% by weight of the alpha cellulose fibers employed in Example 1, the puree then being mixed for 10 minutes to disperse the fibers uniformly therethrough. The puree is then passed through the centrifugal extractor of Example 1 to separate a high yield of low solids content juice from a residual pulp containing the cellulose fibers. Such residual pulp is then combined with the residue from the pulping machine and the combined product extracted in a continuous screw press to recover the press juice.

*Example 9*

An initial Concord grape pulp as received from the conventional stemmer and crusher is heated to about 175° F. with accompanying agitation and then sieved through a pulping machine to separate a thin puree from a residue consisting of a wet mixture of seeds and adhering pulp and skin fragments. 4% by weight of the alpha cellulose fibers of Example 1 are then added to the puree and dispersed uniformly by agitating the puree for 10 minutes.

The puree is then passed through a continuous screw press of the type disclosed in Patent 2,664,814 to separate a high yield of low solids content juice from a residual pulp containing the cellulose fibers. This residual pulp is then combined with the residue from the pulping machine and extracted in a continuous screw press of the type just referred to in order to recover the press juice.

*Example 10*

Three thousand pounds (337 gallons) mushy, over-ripe Concord grapes were stemmed and crushed, the resulting pulp then being heated to 110° F. Twelve pounds (0.4% by weight) of "Pectinol M" was then added to the pulp and mixing was continued for 30 minutes while maintaining the 110° F. temperature.

Over a period of 15 minutes, the pulp was then heated to 138° F. Twenty-five pounds (0.83%) of the cellulose fibers of Example 1 were then added and mixing continued for 10 minutes.

2817 pounds of the resulting pulp was then pumped through the centrifugal extractor employed in Example 1 at a rate of 150 pounds per minute. The free run juice so obtained totalled 2423 pounds, or 86% by weight of the pulp extracted, and was free from skin flakes with a solids content of 0.8% by volume.

The residual pulp, amounting to 394 pounds, was then extracted at a rate of 2 tons per hour with a vertical continuous screw press of the type disclosed in Patent 2,664,814 with the counter pressure set at 80 pounds. This extraction step recovered 197 pounds of press juice having a suspended solids content of 3.0% by volume. Total juice extracted from the over-ripe grapes was thus 93% by weight.

*Example 11*

74 ounces of washed McIntosh apples were combined with 1% by weight of the alpha cellulose fibers of Example 1 and then disintegrated to a fluid pulp. The pulp was then passed through a horizontal continuous screw extractor with .02" screen, giving a free run juice of 35 ounces, or 47.3% by weight, having a suspended solids content of 2% by volume.

The residual pulp containing the cellulose fibers was then passed through the same extractor, using a higher counter pressure, to obtain 19 ounces of press juice containing 3% by volume suspended solids. Total juice recovered was 72% by weight of the bulk apples treated.

*Example 12*

Two pounds of washed dried prunes were combined with 4 pounds of water and pressure cooked at 15 pounds stream pressure for 10 minutes. The pressure cooker was then drained, giving an extract amounting to 3.5 pounds (.38 gallon). The 2.5 pounds of remaining pulp and seeds was put through a food mill to separate 2 pounds of puree.

To the puree was then added 2% by weight of the alpha cellulose fibers. The puree was then passed through a horizontal continuous screw press with .02" screen to recover 1.8 pounds of juice having a suspended solids content of .35% by volume.

*Example 13*

Two pounds, 13 ounces of pulpy orange juice, obtained by reaming orange halves on a conventional household reamer and containing a high rag content and 10% by weight finer solids, was combined with .5% by weight of the alpha cellulose fibers of Example 1 and agitated to disperse the fibers. The material was then passed through a horizontal continuous screw press, yielding a juice containing less than 1% by volume of suspended solids. The residual pulp recovered from the extraction zone was characterized by the fact that the alpha cellulose fibers were colored a deep yellow, having picked up a substantial proportion of the pigment of the juice.

*Example 14*

Crushed and stemmed over-ripe Concord grapes amounting to 2045 grams were combined with .4% by weight "Pectinol M" and heated at 115° F. for about 30 minutes with concurrent maceration. This conditioned pulp was then heated to 160° F.

To the resulting highly fluid grape pulp was then added 1% by weight of that filtermass mentioned hereinbefore, a soft sheet filtermass manufactured from cotton linters and consisting of purified alpha cellulose fibers substantially free from fines and predominantly somewhat less than 10 mm. in length. The filtermass sheet was broken into fragments before addition to the pulp and these fragments readily disintegrated to allow uniform distribution of the fibers in a few minutes mixing time.

The pulp was then passed through a continuous horizontal screw press having a .02" screen, yielding a free run juice amounting to 72.2% by weight of the original pulp and having a suspended solids content of 0.8% by volume.

The residue from this pressing operation was then passed again through the same press, operating under higher pressure, yielding a press juice amounting to 17.8% by weight of the original pulp and having a suspended solids content of 1.2% by volume.

*Example 15*

A few quarts of home canned peaches were drained and then put through a food mill to simulate the action of a commercial pulping apparatus. To the resulting pulp was added 1% by weight of the alpha cellulose fibers of Example 1. The pulp was then mixed for 15 minutes to disperse the fibers and allow absorption of the juice.

The pulp was then put through a horizontal continuous screw extractor with a .02" screen, obtaining 60% by weight free run juice having a suspended solids content of 1.2% by volume. The residue was an easily compressible semi-solid mass suitable for further extraction in a continuous screw press.

*Example 16*

Several half grapefruit peels were cut into strips and reduced to relatively finely chopped form by means of a No. 72 Universal food chopper equipped with a 16-tooth blade. The total of 343.5 grams chopped peel was combined with 1030.5 grams water, brought to a boil, drained, and the solid residue lightly pressed to provide a crumbly mass. Such mass was combined with an additional 1030.5 grams water and this was treated with hydrochloric acid until acid to methyl orange indicator. The product was then heated at 200° F. for 25 minutes, yielding 1417.5 grams of a thick, gelatinous puree containing translucent particles.

To this puree was added 1.5% by weight of the alpha cellulose fibers of Example 1. The puree was then passed through a continuous horizontal screw press, producing 60% by weight pectin extract substantially free of solids. The residue from this pressure extraction step, containing 88% by weight moisture, was passed again through the press under higher pressure. Yielding an additional 16% by weight of pectin extract substantially free from solids. Moisture content of the final residue was 62% by weight.

*Example 17*

To simulate commercial extraction of starch from potatoes, 455 grams of potato pulp was obtained by rasping cleaned Katadin potatoes. A slurry was prepared by combining this pulp with 4550 grams water. In excess of 90% of the starch was separated out by allowing the starch to settle and decanting the slurry.

To the remaining slurry, amounting to approximately 4490 grams, was added 1% by weight (of the original potato pulp) of the alpha cellulose fibers of Example 1, the fibers being uniformly distributed by mixing. The slurry was then passed through a horizontal continuous screw press with a .02" screen for initial dewatering. The residual pulp amounted to 179 grams and dried readily to 32 grams without any material tendency to form a sticky mass which would be difficult to remove from the drier. The water discharged from the press contained materially less than 1% by volume suspended solids.

As has been pointed out, the process of this invention employs 0.5–5% by weight of alpha cellulose fibers low in fiines and predominantly in the range of 1–10 mm. in length. The particular quantity of fibers, within the weight range specified, depends upon both the material being treated and the type of pressure extraction equipment employed to carry out the process. Thus, for example, where certain types of centrifugal extractors are to be employed, the proportion of alpha cellulose fibers is advantageously kept within the range of 0.5–1.5% by weight to assure ready flow of the material through the extractor. On the other hand, where a particularly fluid pulp is to be treated in a continuous screw press or in a reciprocating hydraulic press, the alpha cellulose fibers may advantageously be kept within the higher portion of the range.

The effectiveness of the alpha cellulose fibers employed, and also of the preferred pulp conditioning procedures of the invention, is illustrated by the following table showing extractions on a hydraulic rack and cloth press. Here, pulp A is a Concord grape pulp conditioned solely by heating and macerating at 145° F., while pulp B is a Concord grape pulp conditioned by adding 0.3% by weight "Pectinol M" pectic substance-degrading enzymatic material, macerating at 110° F. and heating then to 145° F.

|  | Suspended Solids (Percent by volume) | Yield (Gals./ton of pulp) |
|---|---|---|
| 1. Pulp A with no additive | 1.3 | 188 |
| 2. Pulp A with 0.5% diatomaceous earth filter aid | 1.5 | 189 |
| 3. Pulp A with 0.5% disintegrated purified wood fibers predominantly 0.3 mm. in length | 0.9 | 189 |
| 4. Pulp A with 0.5% alpha cellulose fiber of Example 1 | 0.3 | 195 |
| 5. Pulp B with no additive | 2.6 | 195 |
| 6. Pulp B with 0.5% diatomaceous earth filter aid | 2.2 | 195 |
| 7. Pulp B with 0.5% disintegrated purified wood fibers predominantly 0.3 mm. in length | 1.8 | 192 |
| 8. Pulp B with 0.5% alpha cellulose fibers of Example 1 | 0.5 | 200 |

Except in the case of procedures 4 and 8 of the foregoing table, continuous pressure extraction, as in a centrifugal extractor or a continuous screw press, could not be carried out acceptably. As has been pointed out, effectiveness of the present process is dependent upon the ability of the particular alpha cellulose fibers to form a swollen intertangled mass which may be highly compressed for maximum exrtaction of the juice without an excessive proportion of the pulp solids, which are characterized by a high degree of slippage, escaping from the mass to enter the extracted juice or clog the extraction apparatus, and without any material passing with the juice.

It will be apparent that the foregoing portion of this specification provides a basis for a process for conditioning grape material preparatory to the extraction of juice therefrom and which process comprises adding to a mass of grape material a pectin hydrolyzing agent, and finely divided wood pulp fiber, the latter being characterized by a surface rough through the presence of hair-like processes enabling it to hold contacting solids particles freed in the mass as the result of disintegration of the fruit tissue, dispersing the additives throughout the mass by mixing, whereby the wood pulp fiber forms a three dimensional web-like network throughout the mass positioned to intercept, and inhibit the independent migration of, said particles, and maintaining the mixture at a temperature within the reaction range of the hydrolyzing agent for a sufficient time to obtain a substantial hydrolyzing effect, then progressively reducing the volume of the mass, whereby the juice is extracted independently of the solids particles, the latter being retained in their relatively dispersed positions in said mass.

One method provides the addition to a mass of grape material from 0.1% to 0.2% by weight of a pectin hydrolyzing enzyme, and 0.2% to 0.5% of finely divided wood pulp fiber having certain characteristics. These percentages overlap the amounts specified earlier in this specification.

Another method provides for the addition to fruit material for the extraction of juice therefrom of from 0.1% to 0.2% by weight of a pectin hydrolyzing enzyme, and 0.2% to 0.5% of finely divided wood pulp fiber having certain characteristics. These percentages overlap the amounts specified earlier in this specification. By this method there is also provided treatment of the mass within the temperature range of from substantially 100° F. to 130° F. for a duration of substantially from thirty minutes to one hour.

This is a continuation-in-part of my application for patent Serial No. 456,247, filed September 15, 1954, Methods for Recovering Liquids from Vegetative Materials, now abandoned.

I claim:

1. A method for obtaining a high separation of liquids from solids in a highly fluid vegetative pulp a predominant proportion of the liquid retaining particles of which are ruptured, comprising uniformly distributing in such pulp 0.5–5% by weight of alpha cellulose fibers substantially free from fines and predominantly in the range of 1–10 mm. in length, and then subjecting the pulp to compressive extraction to separate the liquid from a residual pulp comprising pulp solids retained by an intertangled mass of said fibers.

2. A method for obtaining high yields of low solids content juice from vegetative materials comprising crushing such material to provide an initial pulp, disrupting a predominant proportion of the juice retaining particles of said initial pulp to provide a highly fluid conditioned pulp, uniformly distributing in said conditioned pulp 0.5–5% by weight of alpha cellulose fibers substantially free from fines and predominantly in the range of 1–10 mm. in length, and subjecting said pulp to compressive extraction to recover the juice therefrom.

3. A method for obtaining high yields of low solids content juice from fruits comprising preparing an initial pulp of the fruit, incorporating in said initial pulp a pectic substance-degrading enzyme preparation in amount not less than 0.2 nor more than 0.4% by weight of the initial pulp, heating said initial pulp with its added enzyme preparation at about 100–125° F. for about 10–60 minutes while macerating the pulp, whereby a conditioned pulp is produced characterized by high fluidity and a predominant proportion of ruptured juice retaining particles, uniformly distributing in said conditioned pulp 0.5–5% by weight of alpha cellulose fibers substantially free from fines and predominantly in the range of 1–10 mm. in length, and then subjecting said conditioned pulp to compressive extraction to recover the juice therefrom.

4. A method for obtaining high yields of low solids content juice from fruits comprising preparing an initial pulp of the fruit, incorporating in said initial pulp a pectic substance-degrading enzyme preparation in amount not less than 0.2 nor more than 0.4% by weight of the initial pulp, heating said initial pulp with its added enzyme preparation at about 100–125° F. for about 10–60 minutes while macerating the pulp, then supplying additional heat to said pulp to raise the temperature thereof to a terminal value of 140–200° F. in a time period of 5–30 minutes, uniformly distributing in said pulp 0.5–5% by weight of alpha cellulose fibers substantially free from fines and predominantly in the range of 1–10 mm. in length, and then subjecting the pulp to compressive extraction to recover the juice therefrom.

5. A method for obtaining high yields of low solids content juice from Concord grapes comprising crushing and stemming the grapes to provide an initial pulp, incorporating in said initial pulp a pectic substance-degrading enzyme preparation in amount not less than 0.2 nor more than 0.4% by weight of the initial pulp, heating said initial pulp with its added enzyme preparation at about 100–125° F. for about 10–60 minutes while macerating the pulp, then supplying additional heat to the pulp to raise the temperature thereof to a terminal value of about 140–175° F. in a time period of 5–30 minutes, uniformly distributing 0.5%–5% by weight of alpha cellulose fibers substantially free from fines and predominantly in the range of 1–10 mm. in length, and then continuously pressure extracting said pulp to recover the juice therefrom.

6. A method for obtaining high yields of low solids content juice from grapes comprising crushing and stemming the grapes to provide an initial pulp, sieving said initial pulp to separate the same into a puree and a residual pulp, uniformly distributing in said puree 1–5% by weight of alpha cellulose fibers substantially free from fines and predominantly in the range of 1–10 mm. in length, passing said puree continuously through a pressure extracting zone to recover free run juice and provide a second quantity of residual pulp containing said fibers, combining said second quantity of residual pulp with the residual pulp from said sieving operation, and passing the combined residual pulp through a continuous pressure extraction zone to recover press juice.

7. A method for obtaining high yields of low solids content juice from a vegetative material comprising crushing such material to provide an initial pulp, disrupting a predominant proportion of the juice retaining particles of said initial pulp to provide a highly fluid conditioned pulp, uniformly distributing in said conditioned pulp a small proportion of alpha cellulose fibers substantially free from fines and predominantly in the range of 1–10 mm. in length, said small proportion being in the range of 0.5–1.5% by weight but less than that amount which will so thicken the pulp that the same will not flow through a centrifugal extractor, continuously flowing said pulp through a centrifugal extraction zone, recovering from said centrifugal extraction zone free run juice and a residual pulp consisting of pulp solids retained by an intertangled mass of said fibers, and pressure extracting said residual pulp to recover press juice therefrom.

8. A method for treating grapes comprising crushing the grapes substantially at room temperature to obtain an initial pulp, disrupting a predominant proportion of the juice retaining fragments of said pulp while the same is substantially at room temperature to produce a conditioned pulp characterized by markedly increased fluidity, uniformly distributing in said conditioned pulp 1–5% by weight of alpha cellulose fibers substantially free from fines and predominantly in the range of 1–10 mm. in length, then passing said conditioned pulp substantially at room temperature continuously through a pressure extraction zone to obtain a cold pressed free run juice having a characteristic fresh grape flavor, recovering from said zone a residual pulp consisting of grape pulp solids retained by an intertangled mass of said fibers, and continuously pressure extracting said residual pulp.

9. A method for treating grapes comprising crushing the grapes substantially at room temperature to obtain an initial pulp, disrupting a predominant proportion of the juice retaining fragments of said pulp while the same is substantially at room temperature to produce a conditioned pulp characterized by markedly increased fluidity, uniformly distributing in said conditioned pulp 1–5% by weight of alpha cellulose fibers substantially free from fines and predominantly in the range of 1–10 mm. in length, then passing said conditioned pulp substantially at room temperature continuously through a pressure extraction zone to obtain a cold pressed free run juice having a characterized fresh grape flavor, recovering from said zone a residual pulp consisting of grape pulp solids retained by an intertangled mass of said fibers, heating such residual pulp to from about 140° F. to about 200° F., and continuously pressure extracting said heated residual pulp.

10. A method for treating grapes comprising crushing the grapes substantially at room temperature to obtain an initial pulp, incorporating in said initial pulp a pectic substance-degrading enzyme preparation in amount not less than 0.2 nor more than 0.4% by weight of the initial pulp, macerating said pulp with its added enzyme preparation while substantially at room temperature for about 10–60 minutes, uniformly distributing in said pulp 1–5% by weight of alpha cellulose fibers substantially free from fines and predominantly in the range of 1–10 mm. in length, then passing said pulp and added substance substantially at room temperature continuously through a pressure extracting zone to obtain a cold press-free run juice having a characteristic fresh grape flavor, recovering from said zone a residual pulp consisting of grape pulp solids retained by an intertangled mass of said fibers, and continuously pressure extracting said residual pulp.

11. A method for treating grapes comprising crushing the grapes substantially at room temperature to obtain an initial pulp, incorporating in said initial pulp a pectic substance-degrading enzyme preparation in amount not less than 0.2 nor more than 0.4% by weight of the initial pulp, macerating said pulp with its added enzyme preparation while substantially at room temperature for about 10–60 minutes, uniformly distributing in said pulp 1–5% by weight of alpha cellulose fibers substantially free from fines and predominantly in the range of 1–10 mm. in length, then passing said pulp and added substance substantially at room temperature continuously through a pressure extracting zone to obtain a cold press-free run juice having a characteristic fresh grape flavor, recovering from said zone a residual pulp consisting of grape pulp solids retained by an intertangled mass of said fibers, heating such residual pulp to from about 140° F. to about 200° F., and continuously pressure extracting said heated residual pulp.

12. A method for obtaining high yields of low solids content juices from vegetative materials of the class consisting of carrots, beets, celery, rhubarb, apples, pears, quinces, peeled pineapples and peel-free pineapple fragments comprising combining with said vegetative material 0.5–5% by weight of alpha cellulose fibers substantially free from fines and predominantly in the range of 1–10 mm. in length, then mechanically disintegrating said vegetative material to produce a fluid pulp in which said fibers are uniformly dispersed, and passing said pulp continuously through a pressure extraction zone to recover the juice therefrom.

13. A method for obtaining high yields of low solids content juice from dried prunes comprising adding water to the prunes, cooking the prunes, draining the cooked prunes to recover the extract, forming a seed-free puree from the drained cooked prunes, uniformly distributing in said puree 1–5% by weight of alpha cellulose fibers substantially free from fines and predominantly in the range of 1–10 mm. in length, then passing the puree through a continuous extraction zone to recover the juice therefrom, and combining the juice so obtained with the drained extract.

14. A method for obtaining high yields of low solids content juice from a pulpy mass of citrus fruit material consisting of all of the fruit save the skin, comprising uniformly distributing in said pulpy mass 0.5–5% by weight of alpha cellulose fibers substantially free from fines and predominantly in the range of 1–10 mm. in length, then passing said pulpy mass continuously through a pressure extraction zone to recover the juice therefrom, and recovering from said extraction zone a residual pulp consisting of pulp solids retained by an intertangled mass of said fibers, said fibers carrying a substantial proportion of the pigment of said material.

15. A method for obtaining high yields of low solids content juice from pulpy mass of citrus fruit material, comprising uniformly distributing in said pulpy mass alpha cellulose fibers, substantially free from fines and predominantly in the range of 1–10 mm. in length, and in amounts effective to condition the pulp by absorption of the liquid and to form a swollen intertangled mass, and then progressively reducing the volume of the mass whereby the juice is extracted independently of solid particles, the latter being retained in their relatively dispersed positions in said mass.

16. A method for treating aqueous potato waste from the extraction of potato starch comprising uniformly distributing in such waste 0.5–5% by weight of alpha cellulose fibers substantially free from fines and predominantly in the range of 1–10 mm. in length and then subjecting the waste to continuous pressure extraction to separate a low solids content aqueous liquid from a residue consisting of potato solids retained by an intertangled mass of said fibers.

17. A method for recovering high yields of a low solids content pectin extract from citrus peel comprising comminuting the peel, combining the peel with water and heating the resulting suspension to form a gelatinous puree, uniformly distributing in such puree 0.5–5% by weight of alpha cellulose fibers substantially free from fines and predominantly in the range of 1–10 mm. in length, and then passing the puree through a continuous extraction zone to separate the pectin extract from a residue consisting of citrus peel solids retained by an intertangled mass of said fibers.

18. Process for conditioning grape material preparatory to the extraction of juice therefrom, comprising adding to a mass of grape material a pectin hydrolizing agent, and finely divided wood pulp fiber, the latter being characterized by a surface rough through the presence of hair-like processes enabling it to hold contacting solids particles freed in the mass as the result of disintegration of the fruit tissue, dispersing the additives throughout the mass by mixing, whereby the wood pulp fiber forms a three dimensional web-like network throughout the mass positioned to intercept, and inhibit the independent migration of, said particles, and maintaining the mixture at a temperature within the reaction range of the hydrolizing agent for a sufficient time to obtain a substantial hydrolizing effect, then progressively reducing the volume of the mass whereby the juice is extracted independently of the solids particles, the latter being retained in their relatively dispersed positions in said mass.

19. Process for conditioning grape material preparatory to the extraction of juice therefrom, comprising adding to a mass of grape material from 0.1% to 0.2% by weight, of a pectin hydrolizing enzyme, and 0.2% to 0.5% of finely divided wood pulp fiber, the latter being characterized by a surface rough through the presence of hair-like processes enabling it to hold contacting solids particles freed in the mass as the result of disintegration of the fruit tissue, dispersing the additives throughout the mass by mixing, whereby the wood pulp fiber forms a three dimensional web-like network throughout the mass positioned to intercept, and inhibit the independent migration of, said particles, and maintaining the mixture at a temperature within the reaction range of the hydrolizing agent for a sufficient time to obtain a substantial hydrolizing effect, then progressively reducing the volume of the mass whereby the juice is extracted independently of the solids particles, the latter being retained in their relatively dispersed positions in said mass.

20. The method of extracting juice from fruit material containing native pectin, comprising conditioning the material preparatory to the juice extraction by adding thereto from 0.1% to 0.2% by weight of a pectin hydrolizing enzyme, and from 0.2% to 0.5% by weight of finely divided fibrous material having the rough surface characteristics of wood pulp fiber which enable it to hold contacting solids particles freed in the mass as the result of disintegration of the fruit tissue, agitating the mixture of said material and additives to secure uniform dispersion of the additives throughout the mass whereby the particles holding material forms a three dimensional web-like network throughout the mass positioned to intercept, and inhibit the independent migration of, said particles, holding the mass within a temperature range of from substantially 100° F. to 130° F. for a duration of substantially from thirty minutes to one hour, separating the optimum amount of substantially solids-free juice from the thus conditioned material, leaving a mass of solids with residual juice, and separating the extractable residual juice from said mass, then progressively reducing the volume of the mass whereby the juice is extracted independently of the solids particles, the latter being retained in their relatively dispersed positions in said mass.

21. In a method for obtaining high yields of low solids content juice from Concord grapes wherein there has been prepared an initial pulp of the grapes and the relative viscosity of said pulp has been decreased to from one half to one third of its original value by incorporating in said initial pulp a pectic substance-degrading enzyme preparation in amount not less than 0.2 nor more than 0.4 percent by weight of the initial pulp and said pulp with added enzyme preparation has been heated at about 100–125° F. for about 10–60 minutes while macerating the pulp, the steps of distributing into said pulp of decreased viscosity 0.5–5 percent by weight of alpha cellulose fibers substantially free from fines and predominantly in the range of 1–10 mm. in length, and then passing said pulp continuously through a pressure extraction zone to recover the juice therefrom.

22. A process for conditioning grape material preparatory to the extraction of juice therefrom comprising crushing and stemming grapes to provide an essential pulp, incorporating in said initial pulp a pectic substance degrading enzyme preparation in amount not less than 0.2 nor more than 0.4% by weight of the initial pulp, heating said essential pulp with its added enzyme preparation while macerating the pulp, adding to the macerated pulp cellulose fibers derived from sulphite soft wood pulp from which the fines have been removed and in amount of from 0.5%–5% by weight to the conditioned pulp and said fibers being predominantly in the range of 1–10 mm. in length, dispersing the additives throughout the mass by mixing whereby the wood pulp fiber forms an intertangled fiber mass to trap the grape solids and positioned to intercept and inhibit the independent migration of finer particles, and maintaining the mixture at a temperature within the reaction range of the hydrolizing agent for a sufficient time to obtain a substantial hydrolizing effect, then progressively reducing the volume of the mass whereby the juice is extracted independently of the solids particles, the latter being retained in their relatively dispersed positions in said mass.

23. A method for obtaining a high separation of liquids from solids in a highly fluid vegetative pulp a predominant proportion of the liquid retaining particles of which are ruptured, comprising uniformly distributing in such pulp from 0.5–5% by weight of cellulose fibers derived from sulphite soft wood pulp substantially free from fines and predominantly in the range of 1–10 mm. in length, and then subjecting the pulp to compressive extraction to separate the liquid from a residual pulp comprising pulp solids retained by an intertangled mass of said fibers.

24. A method for obtaining a high separation of liquids from solids in a highly fluid vegetative pulp a predominant proportion of the liquid retaining particles of which are ruptured, comprising uniformly distributing in such pulp alpha cellulose fibers substantially free from fines and predominantly in the range of 1–10 mm. in length, and in amounts effective to condition the pulp by absorption of the liquid and to form a swollen intertangled mass, and then progressively reducing the volume of the mass whereby the liquid is extracted independently of the solids particles, the latter being retained in their relatively dispersed positions in said mass.

25. Process for conditioning vegetative material preparatory to the extraction of liquid therefrom, comprising adding to the mass of vegetative material a pectic hydrolyzing enzyme composition and alpha cellulose fibers substantially free from fines and predominantly in the range of 1–10 mm. in length, dispersing the additives throughout the mass by mixing, maintaining the mixture at a temperature within the reaction range of the hydrolyzing agent for a sufficient time to obtain a substantial hydrolyzing effect, the added fibers being in amounts effective to condition the pulp by absorption of the liquid and to form a swollen intertangled mass, then progressively reducing the volume of the mass, whereby the liquid is extracted independently of solid particles, the latter being retained in their relatively dispersed positions in said mass.

26. The process of removing suspended solids from extracted liquid by the addition of alpha cellulose fibers substantially free of fines and predominantly in the range of 1–10 mm. in length, and in amounts effective to condition the liquid by absorption of the liquid and to form a swollen intertangled mass, and then progressively reducing the volume of the mass whereby the liquid is extracted independently of the solids particles, the latter being retained in their relatively dispersed positions in said mass.

27. A method for recovering high yields of low solids content pectin extract from citrus peel comprising comminuting the peel, combining the peel with water, heating, draining off the water, providing a crumbly mass, recombining with water, acidifying, reheating the resulting suspension to form a gelatinous puree, uniformly distributing in such puree 0.5–5% by weight of alpha cellulose fibers substantially free from fines and predominantly in the range of 1–10 mm. in length, and then passing the puree through a continuous extraction zone to separate the pectin extract from a residue consisting of citrus peel solids retained by an intertangled mass of said fibers.

28. A method for recovering high yields of flow solids content pectin extract from pectin bearing materials comprising, comminuting said materials, combining with water, heating and draining off water, providing a crumbly mass, recombining with water, acidifying, reheating the resulting suspension to form a gelatinous puree, uniformly distributing in such puree 0.5–5% by weight of alpha cellulose fibers substantially free from fines and predominantly in the range of 1–10 mm. in length, and passing the puree through a continuous extraction zone to separate the pectin extract from a residue consisting of material solids retained by an intertangled mass of said fibers.

29. A method for recovering high yields of low solids content pectin extract from pectin bearing materials comprising preparing the gelatinous puree of pectin and material solids, uniformly distributing in such puree 0.5–5% by weight of alpha cellulose fibers substantially free from fines and predominantly in the range of 1–10 mm. in length, and passing the puree through a continuous extraction zone to separate the pectin extract from a residue consisting of material solids retained by an intertangled mass of said fibers.

30. Process for conditioning grape material preparatory to the extraction of juice therefrom and extracting such juice, comprising adding to a mass of grape material, a pectin hydrolizing agent in amount not less than 0.2 nor more than 0.4% by weight of the initial pulp, incorporating with the mass of grape material and hydrolizing agent a finely divided wood pulp fiber prepared from commercially refined bleached sulfite soft wood pulp from which the fines have been removed, said fibers being used in amount of from 0.5–5% by weight and predominantly in the range of 1–10 mm. in length, dispersing the additives throughout the mass by mixing, whereby the wood pulp fiber forms an intertangled fiber mass to trap the grape solids and positioned to intercept and inhibit the independent migration of finer particles, and maintaining the mixture at a temperature within the reaction range of the hydrolizing agent for a sufficient time to obtain a substantial hydrolizing effect, then progressively reducing the volume of the mass whereby the juice is extracted independently of the solids particles, the latter being retained in their relatively dispersed positions in said mass.

31. Process for conditioning grape material preparatory to the extraction of juice therefrom and extracting such juice, comprising adding to a mass of grape material, a pectin hydrolizing agent in amount not less than 0.2 nor more than 0.4% by weight of the initial pulp, incorporating with the mass of grape material and hydrolizing agent a finely divided wood pulp fiber prepared from commercially refined bleached sulfite soft wood pulp by screening the purified pulp to remove the fines, said fibers being used in amount of from 0.5–5% by weight and predominantly in the range of 1–10 mm. in length, agitating the mixture of said material and additives to secure uniform dispersion of the additives throughout the mass whereby the particles holding material forms an intertangled fiber mass to trap the fruit pulp solids and positioned to intercept and inhibit the independent migration of finer particles, holding the mass within a temperature range of from substantially 100° F. to 125° F. for a duration of substantially from 10 minutes to 60 minutes, separating the optimum amount of substantially solids-free juice from the thus conditioned material, leaving a mass of solids with residual juice, and separating the extractable residual juice from said mass by progressively reducing the volume of the mass whereby the juice is extracted independently of the solids particles, the latter being retained in their relatively dispersed positions in said mass.

32. A method for obtaining high yields of low solids content juice from grapes comprising crushing and stemming the grapes to provide an initial pulp, sieving said initial pulp to separate the same into a puree and a residual pulp, uniformly distributing in said puree 1–5% by weight of alpha cellulose fibers substantially free from fines and predominantly in the range of 1–10 mm. in length, passing said puree continuously through a pressure extracting zone to recover free run juice and provide a second quantity of residual pulp containing said fibers, using said residual pulp in combination with juice containing material, and passing such combined material through a continuous pressure extraction zone to recover pressed juice.

33. A method for obtaining high yields of low solids content juice from grapes comprising crushing and stemming the grapes to provide an initial pulp, sieving said initial pulp to separate the same into a puree and a residual pulp, uniformly distributing in said puree 1–5% by weight of alpha cellulose fibers substantially free from fines and predominantly in the range of 1–10 mm. in length, passing said puree continuously through a pressure extracting zone to recover free run juice and provide a second quantity of residual pulp containing said fibers, using said residual pulp in combination with juice containing material, and subjecting such combined material to a separation treatment to recover juice and a pomace containing alpha cellulose fibers.

References Cited in the file of this patent
UNITED STATES PATENTS

| | | |
|---|---|---|
| 2,128,432 | Ramage | Aug. 30, 1938 |
| 2,320,036 | Harris | May 25, 1943 |
| 2,507,827 | Stafford et al. | May 16, 1950 |
| 2,823,126 | Little | Feb. 11, 1958 |
| 2,837,431 | Wolcott | June 3, 1958 |